US008885976B1

(12) United States Patent
Kuo et al.

(10) Patent No.: US 8,885,976 B1
(45) Date of Patent: Nov. 11, 2014

(54) SYSTEMS AND METHODS FOR PERFORMING IMAGE FUSION

(71) Applicant: Cyberlink Corp., Shindian (TW)

(72) Inventors: Chia-Chen Kuo, Taipei (TW); Po-Yu Huang, New Taipei (TW); Wei-Chung Huang, Taichung (TW); Chia-En Chiang, New Taipei (TW)

(73) Assignee: Cyberlink Corp., Shindian, Taipei (TW)

(*) Notice: Subject to any disclaimer, the term of this patent is extended or adjusted under 35 U.S.C. 154(b) by 0 days.

(21) Appl. No.: 14/308,767

(22) Filed: Jun. 19, 2014

Related U.S. Application Data

(60) Provisional application No. 61/837,237, filed on Jun. 20, 2013.

(51) Int. Cl.
*G06K 9/36* (2006.01)
*H04N 5/265* (2006.01)
*H04N 5/21* (2006.01)

(52) U.S. Cl.
CPC .............. *H04N 5/265* (2013.01); *H04N 5/211* (2013.01)
USPC ........... 382/276; 382/103; 382/294; 382/299; 382/284; 382/154

(58) Field of Classification Search
CPC ........... G06T 2207/10144; G06T 2207/10004; G06T 2207/20208; G06T 2207/20221; G06T 5/007; G06T 5/50; G06T 15/04
USPC ................. 382/103, 154, 276, 294, 299, 284; 348/43, 242; 345/418, 419, 430, 619, 345/629
See application file for complete search history.

(56) References Cited

U.S. PATENT DOCUMENTS

| | | | |
|---|---|---|---|
| 6,469,710 B1 * | 10/2002 | Shum et al. | 345/619 |
| 2012/0050474 A1 * | 3/2012 | Segall | 348/43 |
| 2012/0314103 A1 | 12/2012 | Majewicz et al. | |
| 2013/0028509 A1 * | 1/2013 | Moon et al. | 382/162 |
| 2013/0070965 A1 | 3/2013 | Jang et al. | |

FOREIGN PATENT DOCUMENTS

CN 102063712 5/2011

OTHER PUBLICATIONS

English language translation of abstract of CN 102063712 (published May 18, 2011).
"Tufuse Two Stage Exposure and Focus Blending Software;" http://www.tawbaware.com/tufuse.htm; Aug. 2012.
Pajares, G., et al.; "A Wavelet-Based Image Fusion Tutorial"; Mar. 2004.

* cited by examiner

*Primary Examiner* — Ali Bayat
(74) *Attorney, Agent, or Firm* — McClure, Qualey & Rodack, LLP

(57) ABSTRACT

A method implemented in an image processing system for combining multi-exposure images comprises obtaining a plurality of images each having different exposure levels for a same scene. A merged weight map for at least one obtained image is constructed by determining at least one merged weight value for at least one pixel of each obtained image based on characteristics of the pixel, wherein the merged weight map comprises a weight map corresponding to the plurality of images. A Gaussian pyramid and a Laplacian pyramid of each obtained image are generated, and a Gaussian pyramid of the merged weight map is generated. A merged Gaussian pyramid and a merged Laplacian pyramid are generated based on the Gaussian pyramid of the merged weight map. An intermediate pyramid is generated based on the merged Laplacian pyramid, and a resultant image is constructed by blending the merged Gaussian pyramid with the intermediate pyramid.

23 Claims, 10 Drawing Sheets
(5 of 10 Drawing Sheet(s) Filed in Color)

SYSTEMS AND METHODS FOR PERFORMING IMAGE FUSION

CROSS-REFERENCE TO RELATED APPLICATION

This application claims priority to, and the benefit of, U.S. Provisional Patent Application entitled, "Systems and Methods for Performing Image Fusion," having Ser. No. 61/837,237, filed on Jun. 20, 2013, which is incorporated by reference in its entirety.

BACKGROUND

Many digital cameras have limited dynamic range and as a result, details of a scene may be missed while capturing an image. Examples of a conventional technique for high dynamic range (HDR) image generation include a multi-exposure image composition method, where the multi-exposure image compositing method includes capturing a plurality of images with different exposures and generating HDR data. An image pyramid is a type of multi-scale signal representation where repeated smoothing and subsampling operations are applied to a source image to generate a series of reduced resolution images. The exposure fusion method merges different parts of different weighted images which may differ according to image contrast levels, saturation levels, exposure levels, and so on. The technique then restores those weighted images seamlessly using pyramidal image decomposition.

Exposure fusion is generally effective when dealing with simple exposure conditions. However, most HDR images consist of complex exposure conditions of a scene and therefore, details in over-exposed and/or under-exposed regions in the image may be lost. Specifically, higher pyramid levels may lose details of highlight and shadow regions and where lower pyramid level may lead to visible transitions in the luminance values from one region of the image to the other, also known as a halo effect.

SUMMARY

Briefly described, one embodiment, among others, is a method implemented in an image processing system for combining multi-exposure images. The method comprises obtaining a plurality of images having different exposure levels for a same scene and constructing a merged weight map for at least one obtained image by determining at least one merged weight value for at least one pixel of each obtained image based on characteristics of the pixel, wherein the merged weight map comprises a weight map corresponding to the plurality of images. The method further comprises generating a Gaussian pyramid and a Laplacian pyramid of each obtained image, generating a Gaussian pyramid of the merged weight map, and generating a merged Gaussian pyramid and a merged Laplacian pyramid based on the Gaussian pyramid of the merged weight map. The method further comprises generating an intermediate pyramid based on the merged Laplacian pyramid, and constructing a resultant image by blending the merged Gaussian pyramid with the intermediate pyramid.

Another embodiment is system for editing images in a frame sequence, comprising a processor and at least one application executable in the processor. The at least one application comprises a media interface for obtaining a plurality of images having different exposure levels for a same scene and a merged weight generator for constructing a merged weight map for at least one obtained image by determining at least one merged weight value for at least one pixel of each obtained image based on characteristics of the pixel, wherein the merged weight map comprises a weight map corresponding to the plurality of images. The at least one application further comprises a pyramid generator for generating a Gaussian pyramid and a Laplacian pyramid of each obtained image; generating a Gaussian pyramid of the merged weight map; generating a merged Gaussian pyramid and a merged Laplacian pyramid based on the Gaussian pyramid of the merged weight map; and generating an intermediate pyramid based on the merged Laplacian pyramid. The at least one application further comprises an image processor for constructing a resultant image by blending the merged Gaussian pyramid with the intermediate pyramid.

Another embodiment is a non-transitory computer-readable medium embodying a program executable in a computing device that comprises code that obtains a plurality of images having different exposure levels for a same scene and code that constructs a merged weight map for at least one obtained image by determining at least one merged weight value for at least one pixel of each obtained image based on characteristics of the pixel, wherein the merged weight map comprises a weight map corresponding to the plurality of images. The program further comprises code that generates a Gaussian pyramid and a Laplacian pyramid of each obtained image, code that generates a Gaussian pyramid of the merged weight map, and code that generates a merged Gaussian pyramid and a merged Laplacian pyramid based on the Gaussian pyramid of the merged weight map. The program further comprises code that generates an intermediate pyramid based on the merged Laplacian pyramid and code that constructs a resultant image by blending the merged Gaussian pyramid with the intermediate pyramid.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for an improved fusion method that preserves details within highlight/shadow regions while minimizing the halo effect. Specifically, various embodiments are directed to combining multi-exposure images by adaptively selecting the pyramid level on a pixel-by-pixel level for purposes of restoring an image to its original resolution. A high dynamic image is generated while details in over-exposed regions and/or under-exposed regions of the image are fully represented without contrast degradation.

Figure 1:
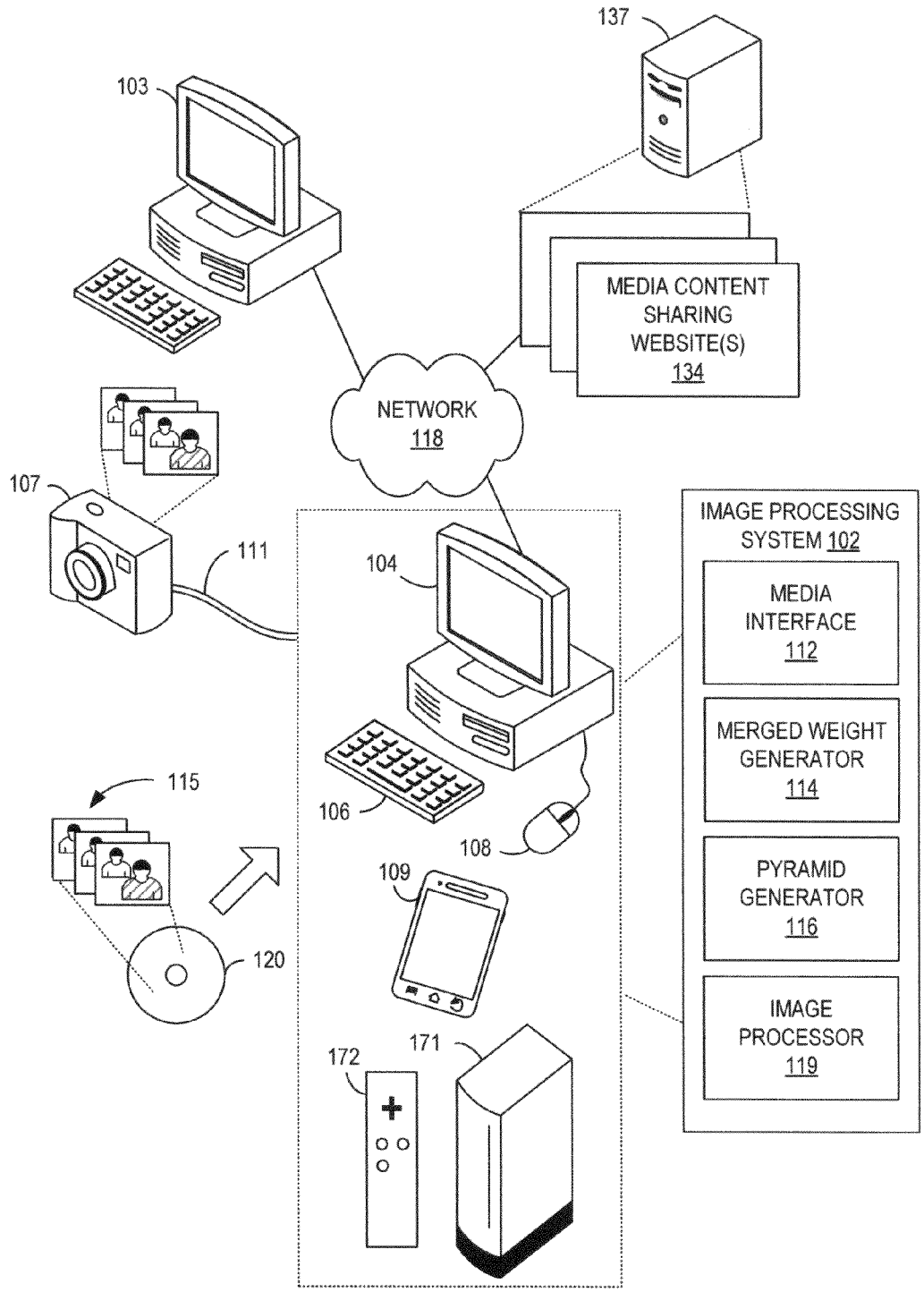
FIG. 1 is a block diagram of an image processing system for combining multi-exposure images to generate a resultant image in accordance with various embodiments of the present disclosure.

A description of a system for combining multi-exposure images to generate a resultant image is now described followed by a discussion of the operation of the components within the system. FIG. 1 is a block diagram of an image processing system 102 in which embodiments of the disclosed techniques for image processing may be implemented. The image processing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the image processing system 102 is embodied as a smartphone 109 or tablet, the user may interface with the image processing system 102 via a touchscreen interface (not shown). In other embodiments, the image processing system 102 may be embodied as a video gaming console 171, which includes a video game controller 172 for receiving user preferences. For such embodiments, the video gaming console 171 may be connected to a television (not shown) or other display 104.

The image processing system 102 is configured to retrieve, via a media interface 112, digital media content 115 stored on a storage medium 120 such as, by way of example and without limitation, a compact disc (CD) or a universal serial bus (USB) flash drive, wherein the digital media content 115 may then be stored locally on a hard drive of the image processing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. For some embodiments, the media interface 112 is executed to obtain a plurality of images each having different exposure levels for a same scene.

The digital media content 115 may be encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), Quick-Time (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1, the media interface 112 in the image processing system 102 may also be configured to retrieve digital media content 115 directly from a digital recording device 107 where a cable 111 or some other interface may be used for coupling the digital recording device 107 to the image processing system 102. The image processing system 102 may support any one of a number of common computer interfaces, such as, but not limited to IEEE-1394 High Performance Serial Bus (Firewire), USB, a serial connection, and a parallel connection.

The digital recording device 107 may also be coupled to the image processing system 102 over a wireless connection or other communication path. The image processing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image processing system 102 may receive digital media content 115 from another computing system 103. Alternatively, the image processing system 102 may access one or more media content sharing websites 134 hosted on a server 137 via the network 118 to retrieve digital media content 115.

The components executed on the image processing system 102 may further include a merged weight generator 114, a pyramid generator 116, an image processor 119, and other applications, services, processes, systems, engines, or functionality not discussed in detail herein. The merged weight generator 114 is executed to construct a merged weight map for at least one obtained image by determining at least one merged weight value for at least one pixel of each obtained image based on characteristics of the pixel. For various embodiments, the merged weight map comprises a weight map corresponding to the plurality of images, as shown, for example, in FIG. 5.

The pyramid generator 116 is executed to generate a Gaussian pyramid and a Laplacian pyramid of each obtained image. The pyramid generator 116 is further executed to generate a Gaussian pyramid of the merged weight map and then generate a merged Gaussian pyramid and a merged Laplacian pyramid based on the Gaussian pyramid of the merged weight map. The pyramid generator 116 further generates an intermediate pyramid based on the merged Laplacian pyramid. The image processor 119 is executed to construct a resultant image by blending the merged Gaussian pyramid with the intermediate pyramid.

Figure 2:
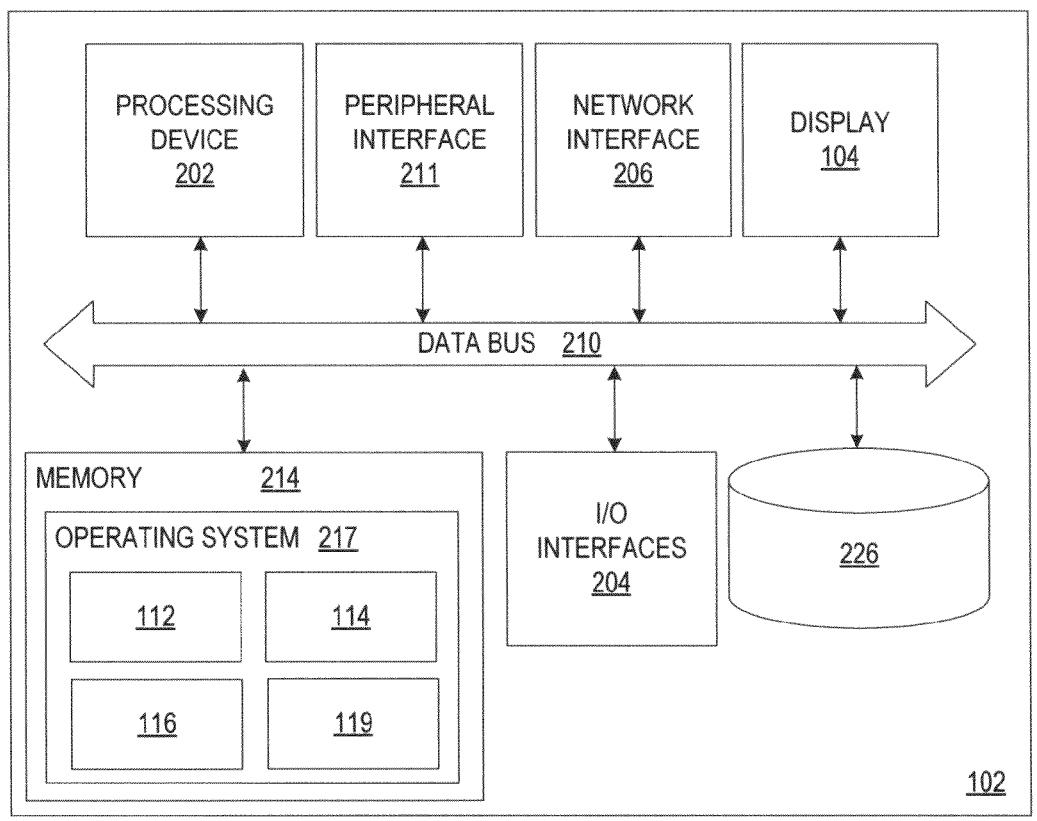
FIG. 2 is a detailed view of the image processing system of FIG. 1 in accordance with various embodiments of the present disclosure.

FIG. 2 is a schematic diagram of the image processing system 102 shown in FIG. 1. The image processing system 102 may be embodied in any one of a wide variety of wired and/or wireless computing devices, such as a desktop computer, portable computer, dedicated server computer, multi-processor computing device, smartphone 109 (FIG. 1), tablet computing device, and so forth. As shown in FIG. 2, the image processing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image processing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements. The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, merged weight generator 114, pyramid generator 116, and image processor 119) of the image processing system 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

In this regard, the term "executable" may refer to a program file that is in a form that can ultimately be run by the processing device 202. Examples of executable programs may be, for example, a compiled program that can be translated into machine code in a format that can be loaded into a random access portion of the memory 214 and run by the processing device 202, source code that may be expressed in proper format such as object code that is capable of being loaded into a random access portion of the memory 214 and executed by the processing device 202, or source code that may be interpreted by another executable program to generate instructions in a random access portion of the memory 214 to be executed by the processing device 202, etc. An executable program may be stored in any portion or component of the memory 214 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Input/output interfaces 204 provide any number of interfaces for the input and output of data. For example, where the image processing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image processing system 102 may communicate with one or more computing devices via the network interface 206 over the network 118 (FIG. 1). The image processing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
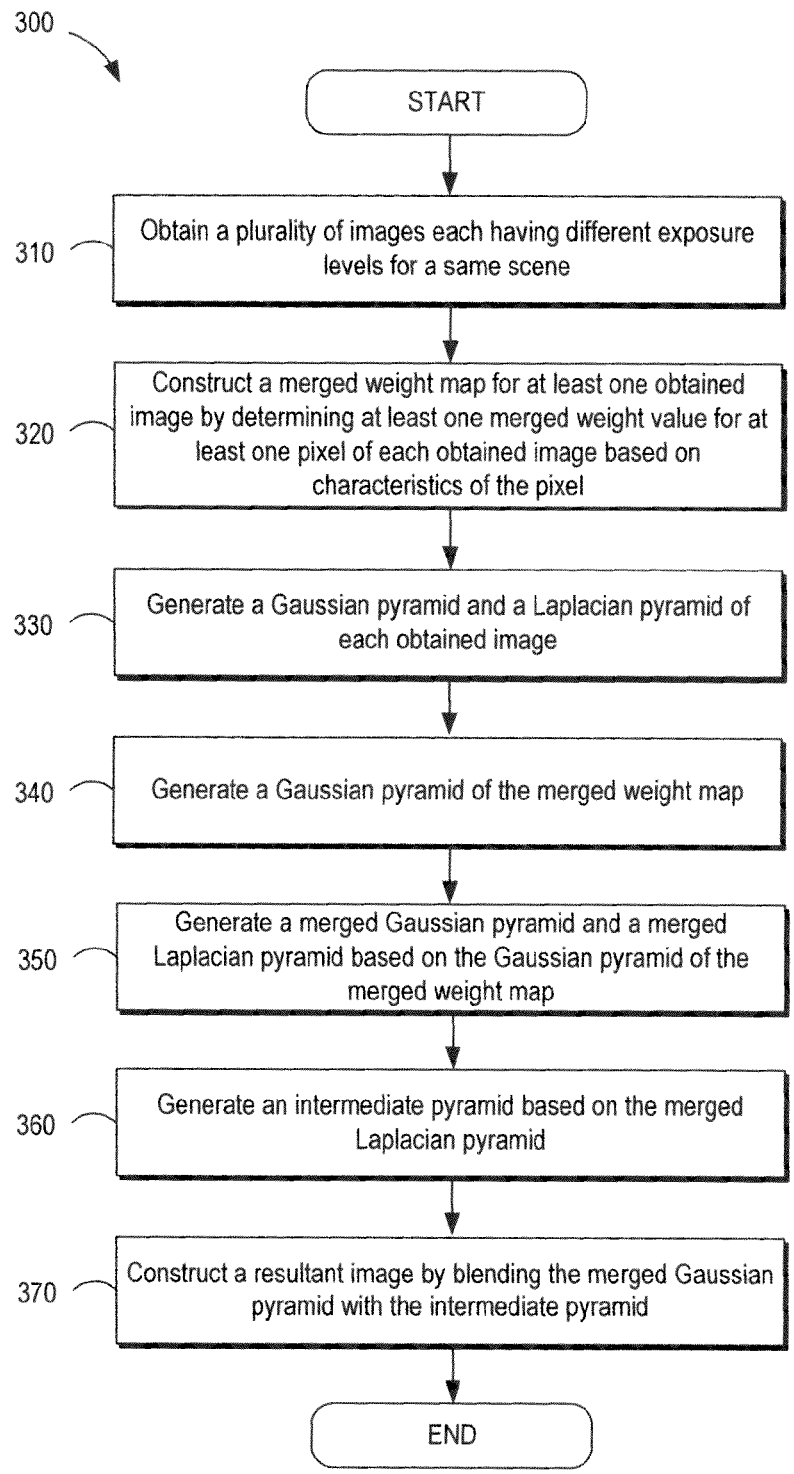
FIG. 3 is a top-level flowchart illustrating examples of functionality implemented as portions of the image processing system of FIG. 1 for combining multi-exposure images according to various embodiments of the present disclosure

Reference is made to FIG. 3, which is a flowchart 300 in accordance with one embodiment of an algorithm for combining multi-exposure images to generate a resultant image by the image processing system 102 of FIG. 1. It is understood that the flowchart 300 of FIG. 3 provides merely an example of the many different types of functional arrangements or algorithm that may be employed to implement the operation of the various components of the image processing system 102. As an alternative, the flowchart of FIG. 3 may be viewed as depicting an example of steps of a method implemented in the image processing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Figure 4:
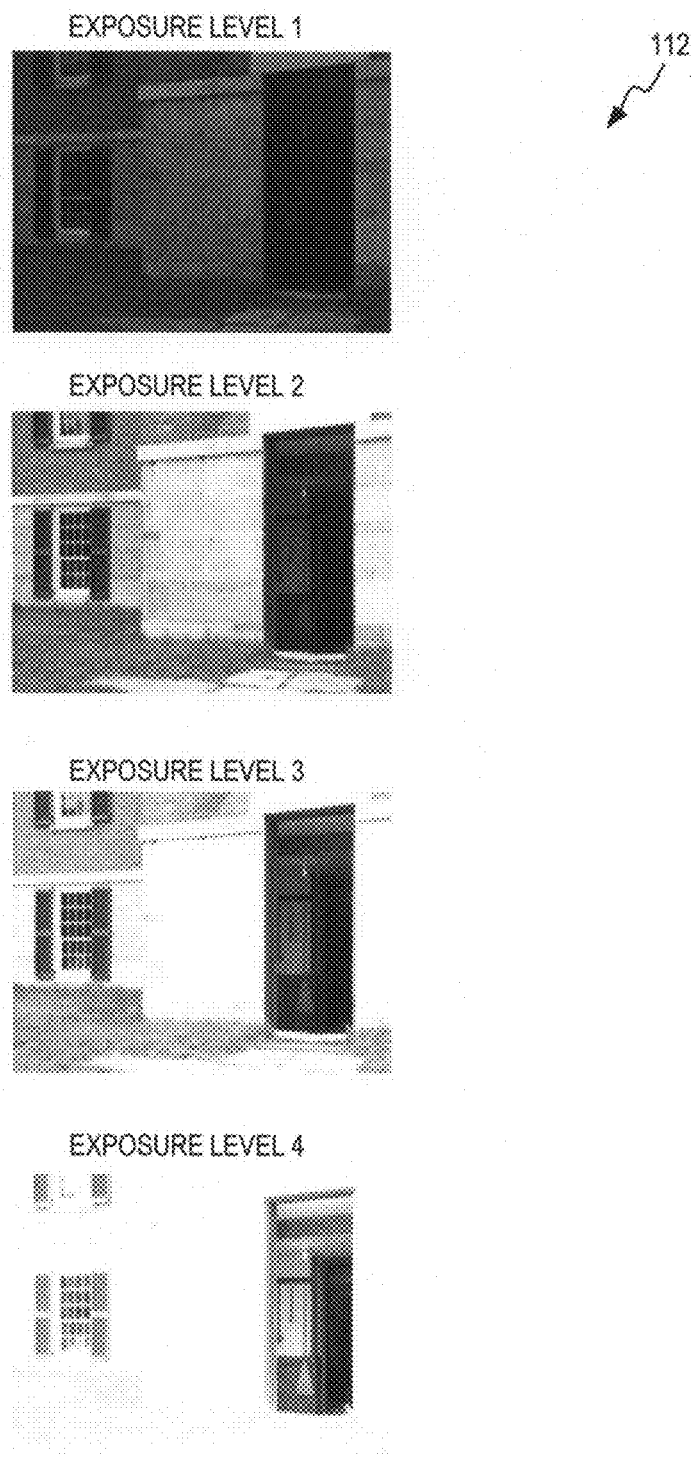
FIG. 4 illustrates operation of the media interface of the image processing system of FIG. 1 in accordance with various embodiments of the present disclosure.

Beginning with block 310, the media interface 112 (FIG. 1) obtains a plurality of images where each image has different exposure levels for a same scene, as illustrated in FIG. 4. In block 320, the merged weight generator 114 (FIG. 1) constructs a merged weight map for at least one obtained image by determining at least one merged weight value for at least one pixel of each obtained image based on characteristics of the pixel. For some embodiments, the merged weight map comprises a weight map that corresponds to the plurality of images.

In block 330, the pyramid generator 116 (FIG. 1) generates a Gaussian pyramid and a Laplacian pyramid of each obtained image. In block 340, the merged weight generator 114 generates a Gaussian pyramid of the merged weight map. In block 350, the pyramid generator 116 generates a merged Gaussian pyramid and a merged Laplacian pyramid based on the Gaussian pyramid of the merged weight map. In block 360, the pyramid generator 116 generates an intermediate pyramid based on the merged Laplacian pyramid. In block 370, the image processor 119 (FIG. 1) constructs a resultant image by blending the merged Gaussian pyramid with the intermediate pyramid.

Figure 9:
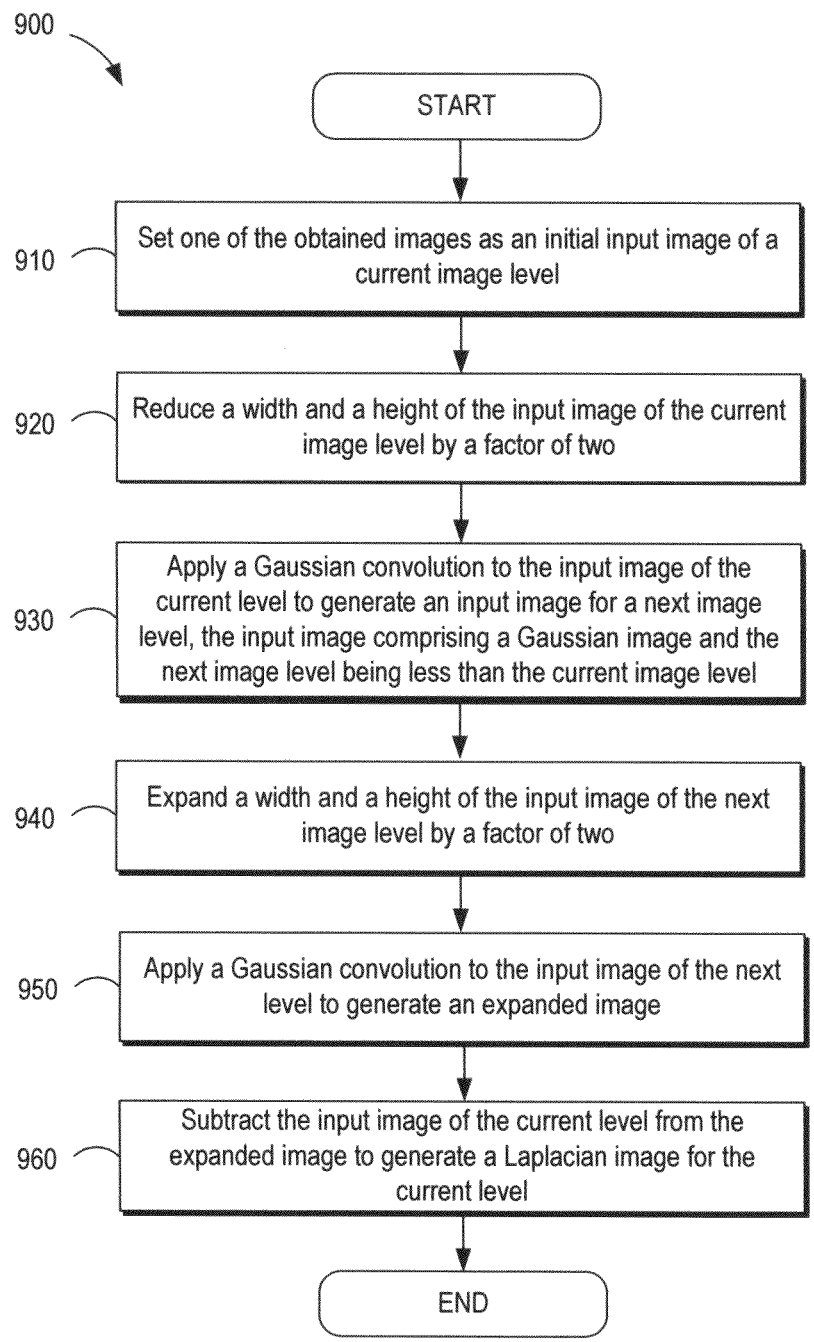
FIG. 9 is a flowchart in accordance with one embodiment of an algorithm for generating a Gaussian pyramid and a Laplacian pyramid performed by the pyramid generator of FIG. 1.

Reference is made to FIG. 9, which is a flowchart 900 in accordance with one embodiment of an algorithm for generating a Gaussian pyramid and a Laplacian pyramid performed by the pyramid generator 116 of FIG. 1. It is understood that the flowchart 900 of FIG. 9 provides merely an example of the many different types of functional arrangements or algorithm that may be employed to implement the operation of the various components of the pyramid generator 116. As an alternative, the flowchart of FIG. 9 may be viewed as depicting an example of steps of a method implemented in the pyramid generator 116 according to one or more embodiments.

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. It is understood that all such variations are within the scope of the present disclosure.

The operations in FIG. 9 are performed for each the images obtained by the media interface 112 (FIG. 1). Beginning with block 910, one of the obtained images is set as an initial input image of a current image level. In block 920, the width and the height of the input image of the current image level are reduced by a factor of two. In block 930, a Gaussian convolution is applied to the input image of the current level to generate an input image for a next image level, where the input image comprises a Gaussian image and where the next image level is less than the current image level. In block 940, the width and the height of the input image of the next image level are expanded by a factor of two. In block 950, a Gaussian convolution is applied to the input image of the next level to generate an expanded image. In block 960, the input image of the current level is subtracted from the expanded image to generate a Laplacian image for the current level. The operations of reducing, expanding, and subtracting described above are repeated for the input image until a predetermined image level is reached.

Figure 10:
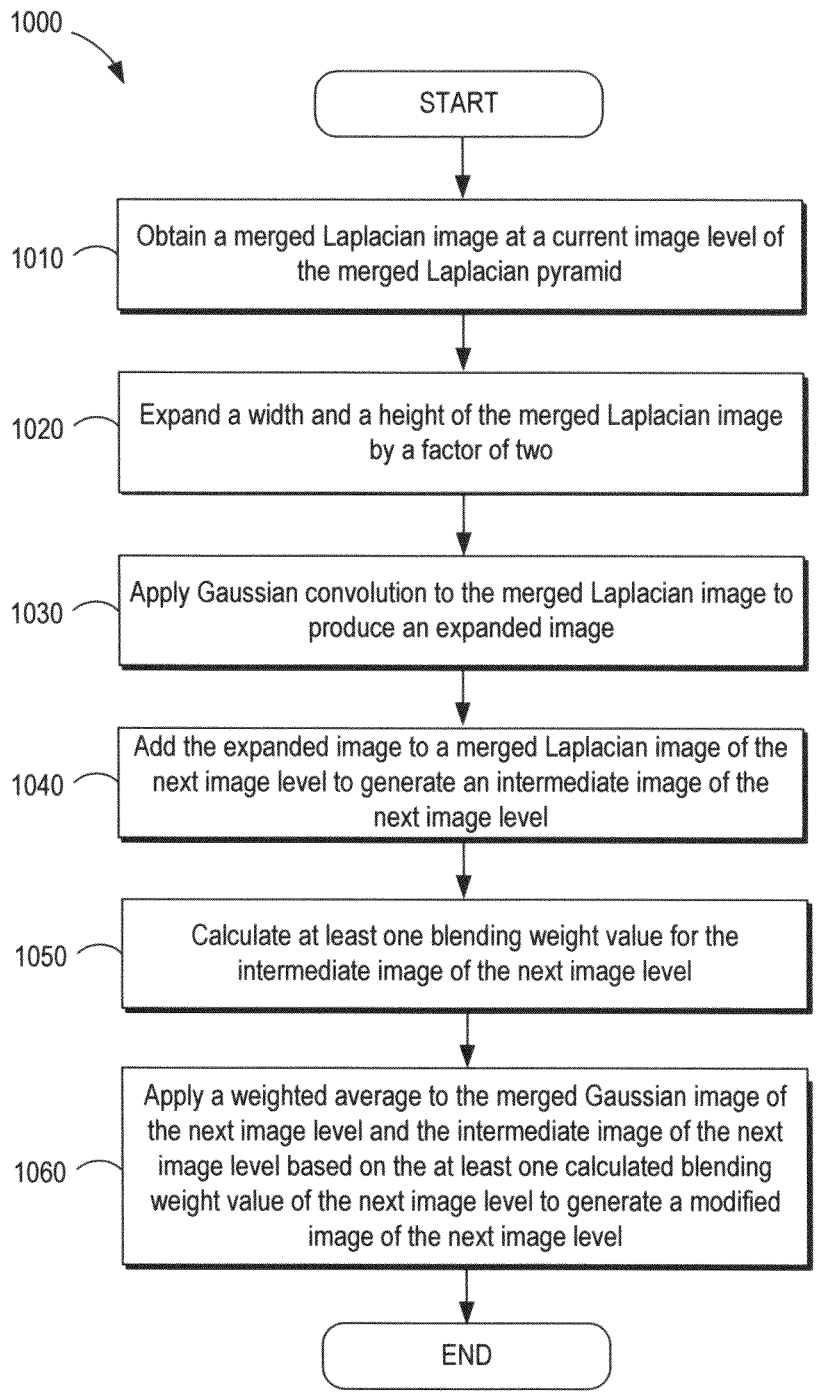
FIG. 10 is a flowchart in accordance with one embodiment of an algorithm for generating an intermediate pyramid based on the merged Laplacian pyramid and constructing a resultant image from the merged Gaussian pyramid and the intermediate pyramid performed by the pyramid generator of FIG. 1.

Reference is made to FIG. 10, which is a flowchart 1000 in accordance with one embodiment of an algorithm for generating an intermediate pyramid based on the merged Laplacian pyramid and constructing a resultant image from the merged Gaussian pyramid and the intermediate pyramid performed by the pyramid generator 116 of FIG. 1. It is understood that the flowchart 1000 of FIG. 10 provides merely an example of the many different types of functional arrangements or algorithm that may be employed to implement the operation of the various components of the pyramid generator 116. As an alternative, the flowchart of FIG. 10 may be viewed as depicting an example of steps of a method implemented in the pyramid generator 116 according to one or more embodiments.

Although the flowchart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. It is understood that all such variations are within the scope of the present disclosure.

Beginning with block 1010, a merged Laplacian image is obtained at a current image level of the merged Laplacian pyramid. In block 1020, a width and a height of the merged Laplacian image are expanded by a factor of two. In block 1030, a Gaussian convolution is applied to the merged Laplacian image to produce an expanded image. In block 1040, the expanded image is added to a merged Laplacian image of the next image level to generate an intermediate image of the next image level. In block 1050, at least one blending weight value is calculated for the intermediate image of the next image level.

In block 1060, a weighted average is applied to the merged Gaussian image of the next image level and the intermediate image of the next image level based on the at least one calculated blending weight value of the next image level to generate a modified image of the next image level. The operations of expanding, adding, calculating, and applying described above are repeated until an original image resolution of the plurality of obtained images is reached. For some embodiments, each of the obtained images has a same original image resolution, and the resultant image comprises the modified image at the original image resolution.

Figure 5:
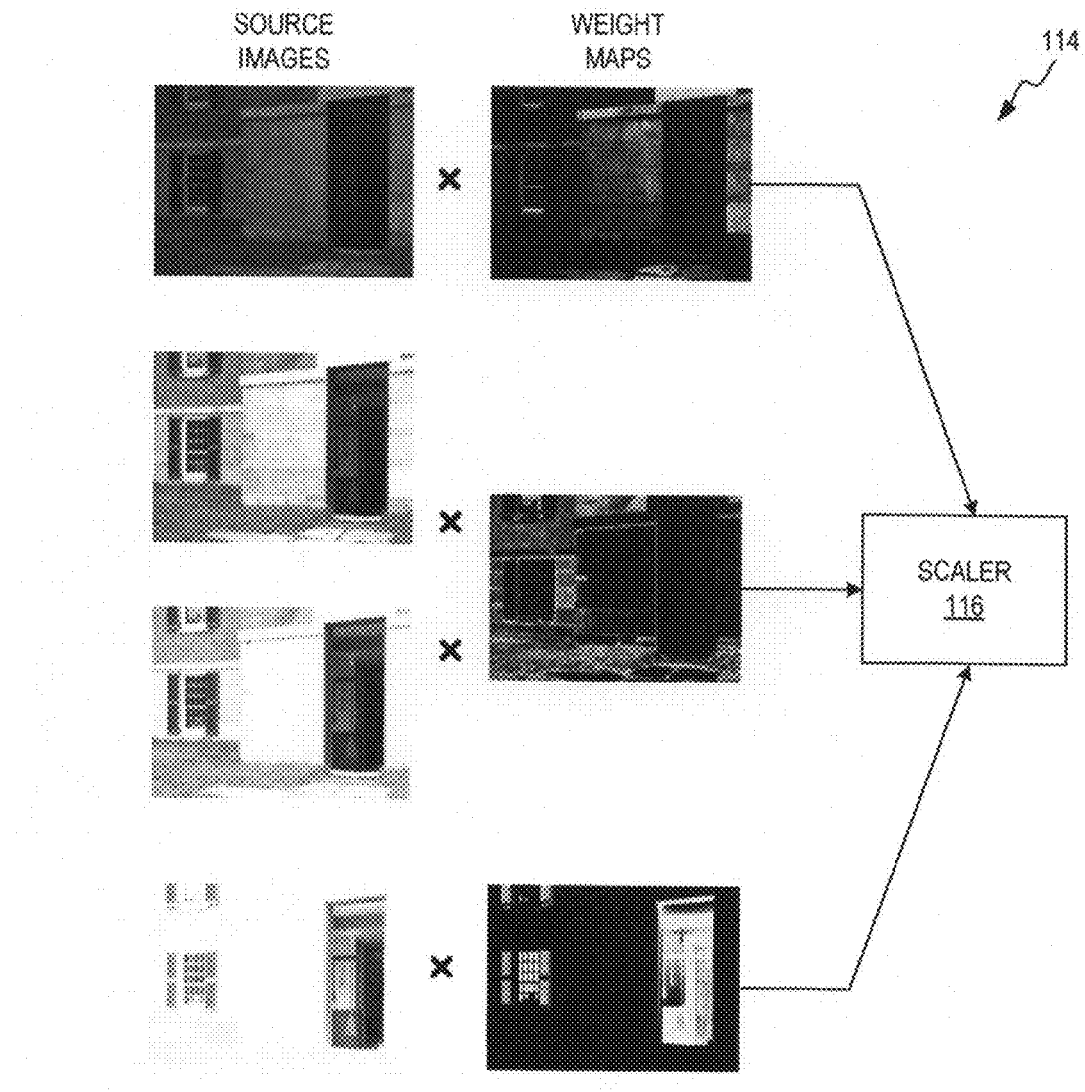
FIG. 5 illustrates operation of the weight calculator of the image processing system of FIG. 1 in accordance with various embodiments of the present disclosure.

Having described various components of the image processing system 102, the operation of various components in the image processing system 102 is now described in more detail. Reference is made to FIG. 5, which illustrates operation of the merged weight generator 114, where weight values are derived for purposes of generating weight maps for each image. For some embodiments, the contrast level, saturation level, and relative exposure level for each pixel in each of the images obtained by the media interface 112 (FIG. 1) is calculated to derive different weight values for each pixel.

The contrast level is calculated by obtaining the absolute value of the Laplacian filter response of the image. The saturation level corresponds to the standard deviation within the R/G/B (red/green/blue) channel, while the relative exposure level is calculated by determining the intensity of a given pixel based on how close the value is to 0.5. This is based on the assumption that the intensity value lies between 0 and 1. The three weight values are then multiplied by the corresponding pixel value, as shown in FIG. 5. Specifically, each pixel in each of the source images is multiplied by a weight map comprising the three different weight values for each location in the weight map. Each weight map represents the contribution of each pixel for each image. As shown in the middle portion, different source images may share the same weight map. The source images are then fused with the corresponding weight map by applying image pyramid decomposition via the pyramid generator 116, as described in more detail below.

Figure 6:
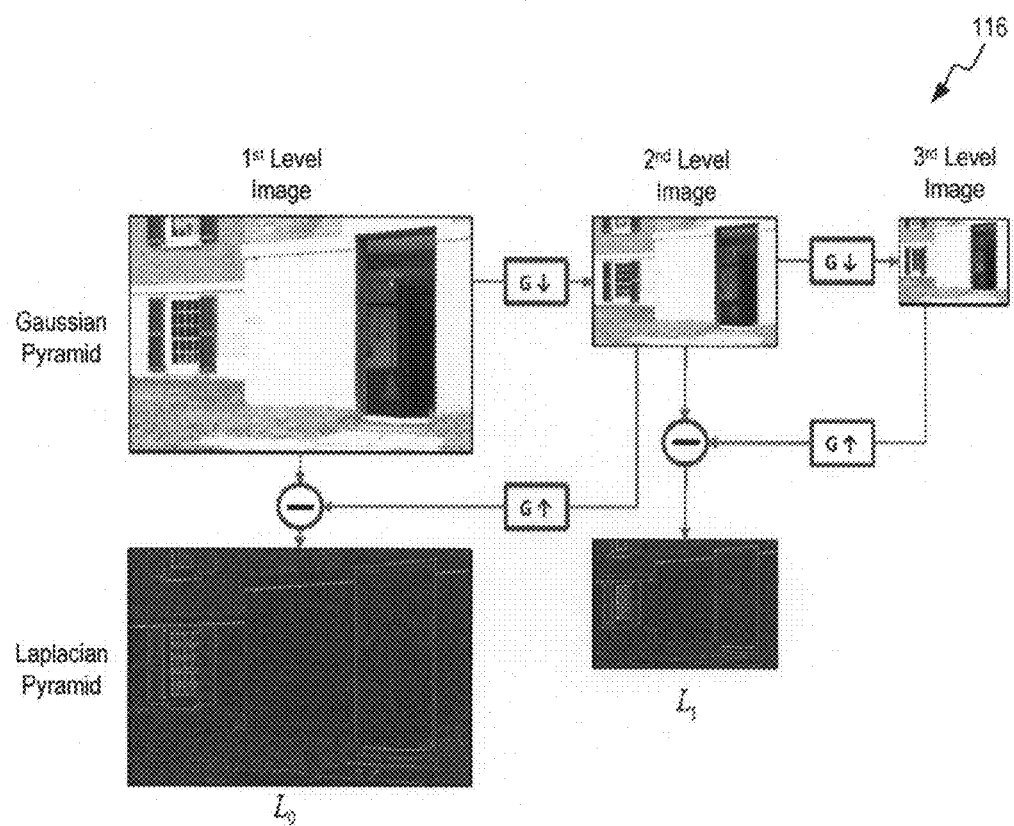
FIG. 6 illustrates operation of the scaler of the image processing system of FIG. 1 in accordance with various embodiments of the present disclosure.

FIG. 6 illustrates operation of the pyramid generator 116, which downscales each source image and the corresponding weight map (shown in FIG. 5) using a Laplacian decomposition and a Gaussian image pyramid scheme. For some embodiments, the pyramid generator 116 subsamples the first level source image within the image pyramid with a low-pass filter to derive a second level image and then upsamples the second image with a low-pass filter again. The pyramid generator 116 subtracts the upsampled second level image from the first level image to obtain the Laplacian response ($L_0$). A similar operation may be performed using the third level image to derive a second order Laplacian response ($L_1$).

Figure 7:
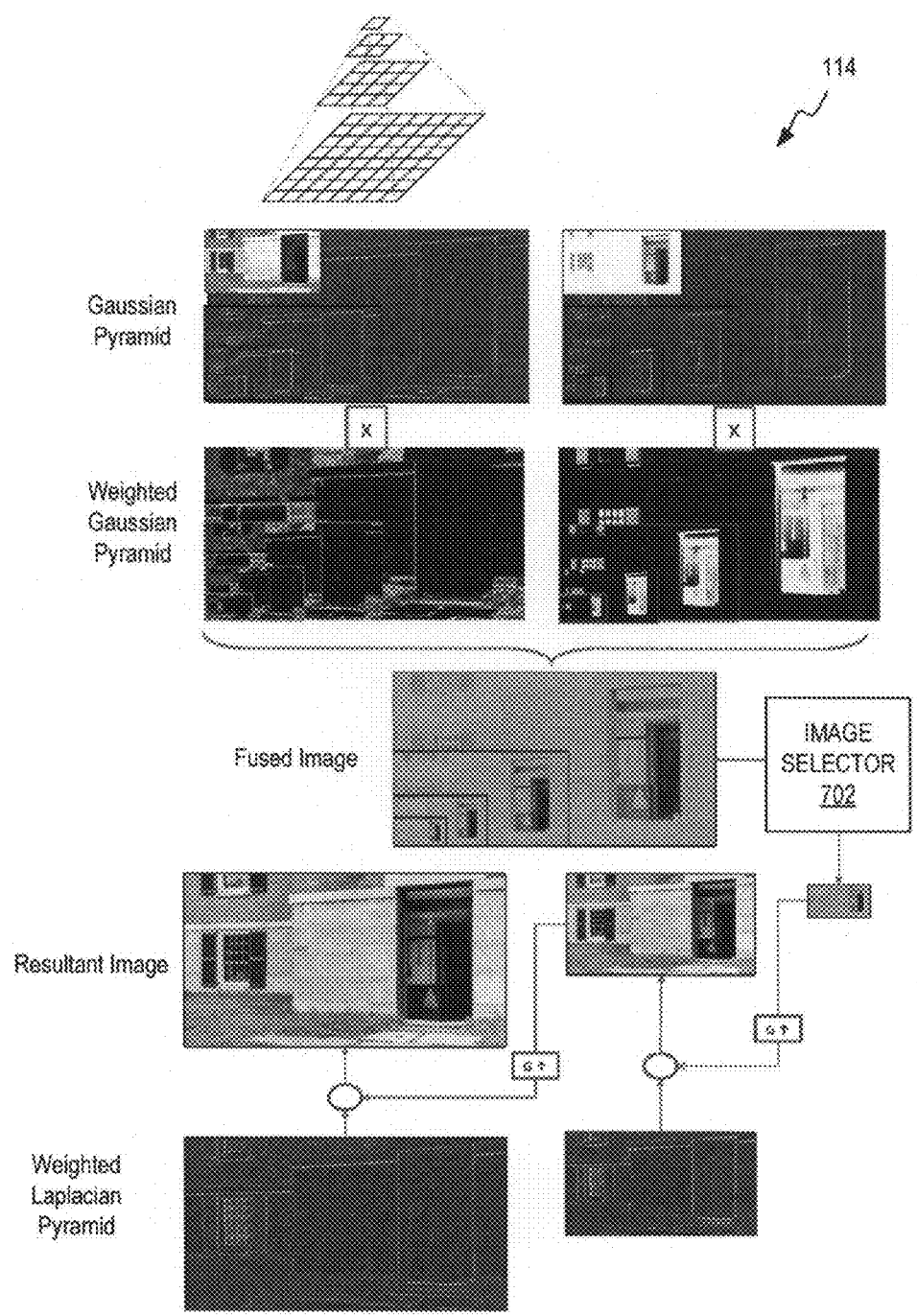
FIG. 7 illustrates operation of the image processor, the image restorer, and the restored weight calculator of the image processing system of FIG. 1 in accordance with various embodiments of the present disclosure.

FIG. 7 illustrates how fused images are generated at each pyramid level. As shown in the upper portion of FIG. 7, the image processing system 102 (FIG. 1) blends source images with corresponding weight map for each level to obtain the fused images of each level. As shown in the lower portion of FIG. 7, upsampling is performed on one the fused images selected by the image selector 702, beginning with the level with the smallest resolution, to restore the image level by level within the image pyramid. The weighted Laplacian response obtained via the downscaling operation is added, and the steps are repeated until the final resolution level (i.e., original size image) is reached. Finally, the pyramid is collapsed to obtain the result image.

The merged weight generator 114 generates a map identifying poor exposure areas within the image for each of the restored image. Specifically, the pixel intensity of the restored image ranges from a darkest intensity level (0.0) to a brightest intensity level (1.0). For various embodiments, an intensity distance from a middle intensity value 0.5 is calculated for each pixel in each restored image and a weight value is determined based on a difference between a predetermined distance threshold and the distance for each pixel in each restored image. For various embodiments, the predetermined threshold is calculated according to the following expression:

$$\text{threshold} = \frac{2^{\text{level of the restored image}}}{\text{strength}};$$

In the expression above, the strength value above typically ranges from 1 to 100 and corresponds to a user-specified factor. The level of the restored image ranges from a value of 1 to the maximum resolution level and represents a restored level number of the Gaussian pyramid. The weight value is calculated according to the following expression:

$$\text{weight value} = \min(1.0, e^{-K*[\max(0, |\text{pixel intensity} - \text{preferred intensity}| - \text{threshold})]^2}).$$

The preferred intensity value and K above are constant terms, where for general cases, the preferred intensity value is typically equal to 0.5 and K is typically equal to 10.

The weight value calculated above typically ranges from a value of 0 to 1 and represents a blending weight value of the restored image. The Pixel Intensity value ranges from 0 to 1 and represents a pixel intensity of the restored image, where the darkest intensity corresponds to 0 and the brightest intensity corresponds to 1. To further illustrate calculation of the weight value, consider an example where strength value is (Strength=50). Based on this value, the Distance Threshold value for Level 1 (the level with the smallest resolution) is equal to 2/50=0.04. The Distance Threshold value for Level 2 is equal to 4/50=0.08. The Distance Threshold value for Level 3 is equal to 8/50=0.16. The Distance Threshold value for Level 4 is equal to 16/50=0.32. Note that when the Distance Threshold value is larger than 0.5, the weight value is also be equal to 1.0.

Figure 8:
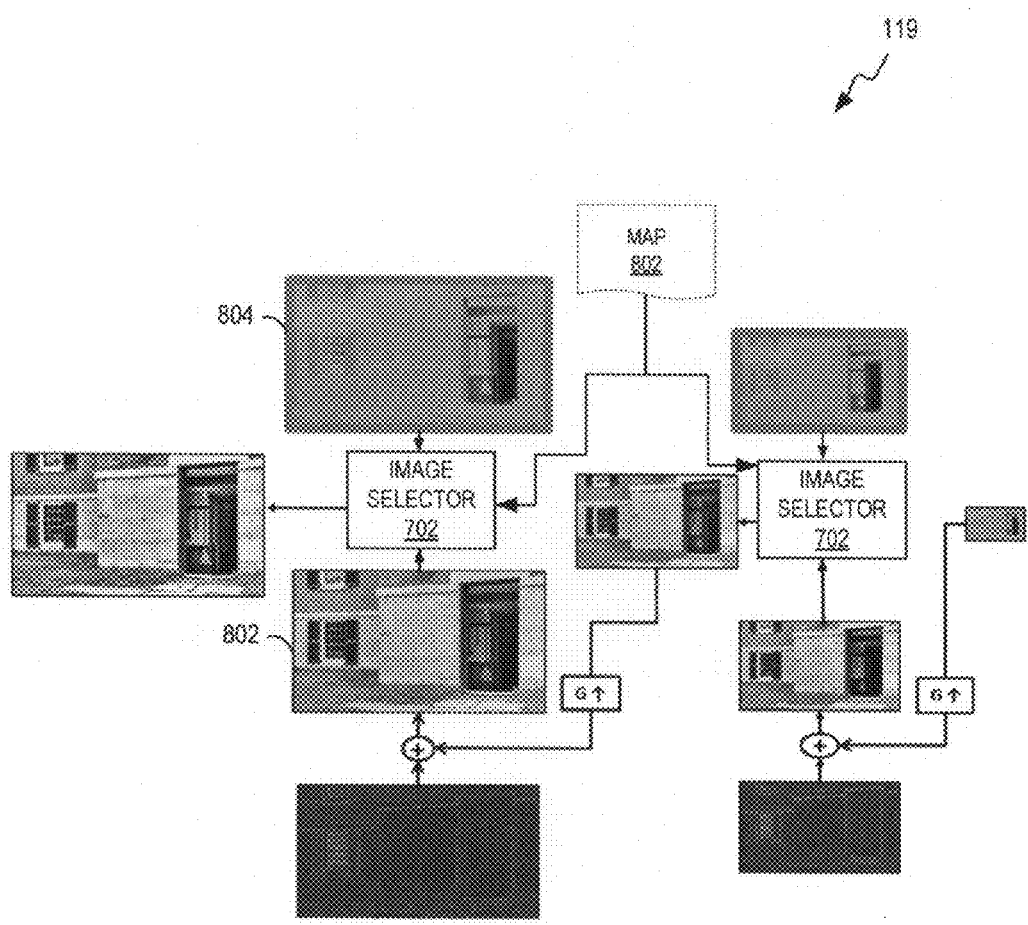
FIG. 8 illustrates construction of images from the merged images and restoration of images based on maps identifying poor exposure areas in accordance with various embodiments of the present disclosure.

Reference is made to FIG. 8, which illustrates construction of images from the merged images and restoration of images by the image processor 119 based on a map 802 identifying poor exposure areas. Notably, weight blending of both fused images and restored images is performed using the map 802 identifying poor exposure areas within the restored images. This is in contrast to other techniques that rely only on restored images. FIG. 8 illustrates how weighted blending is performed. Based on the map 802, if a determination is made that at least some pixels of the original restored image 802 have poor exposure and/or a poor level of detail, the image selector 702 selects the fused image 804 for blending and restoration purposes. This process is performed for each level of the image pyramid until the original source image resolution is reached to obtain the resultant image 806.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in an image processing system for combining multi-exposure images, comprising:
    obtaining a plurality of images having different exposure levels for a same scene;
    constructing a merged weight map for at least one obtained image by determining at least one merged weight value for at least one pixel of each obtained image based on characteristics of the at least one pixel, wherein the merged weight map comprises a weight map corresponding to the plurality of images;
    generating a Gaussian pyramid and a Laplacian pyramid of each obtained image;
    generating a Gaussian pyramid of the merged weight map;
    generating a merged Gaussian pyramid and a merged Laplacian pyramid based on the Gaussian pyramid of the merged weight map;
    generating an intermediate pyramid based on the merged Laplacian pyramid; and
    constructing a resultant image by blending the merged Gaussian pyramid with the intermediate pyramid.

2. The method of claim 1, wherein the characteristics of the at least one pixel comprise at least one of: contrast, saturation, and intensity.

3. The method of claim 1, wherein generating a Gaussian pyramid and a Laplacian pyramid comprises:
    for each of the obtained images, performing the steps of:
        setting one of the obtained images as an initial input image of a current image level;
        reducing a width and a height of the input image of the current image level by a factor of two;
        applying a Gaussian convolution to the input image of the current level to generate an input image for a next image level, the input image comprising a Gaussian image and the next image level being less than the current image level;
        expanding a width and a height of the input image of the next image level by a factor of two;
        applying a Gaussian convolution to the input image of the next level to generate an expanded image; and
        subtracting the input image of the current level from the expanded image to generate a Laplacian image for the current level;
    wherein reducing, expanding, and subtracting are repeated for the input image until a predetermined image level is reached.

4. The method of claim 3, wherein the Gaussian convolution is performed by a Gaussian kernel having a kernel size of X-by-Y, wherein X and Y are positive integers.

5. The method of claim 3, wherein at least one of the width and the height of the predetermined image is less than one.

6. The method of claim 1, wherein generating the merged Laplacian pyramid comprises applying a weighted average for each level of the Laplacian pyramid of each obtained image, wherein the weighted average comprises the Gaussian pyramid of the weight map.

7. The method of claim 1, wherein generating the merged Gaussian pyramid comprises applying a weighted average for each level of the Gaussian pyramid of each obtained image, wherein the weighted average comprises the Gaussian pyramid of the weight map.

8. The method of claim 1, wherein generating an intermediate pyramid based on the merged Laplacian pyramid and constructing a resultant image from the merged Gaussian pyramid and the intermediate pyramid comprises:
  obtaining a merged Laplacian image at a current image level of the merged Laplacian pyramid;
  expanding a width and a height of the merged Laplacian image by a factor of two;
  applying Gaussian convolution to the merged Laplacian image to produce an expanded image;
  adding the expanded image to a merged Laplacian image of the next image level to generate an intermediate image of the next image level;
  calculating at least one blending weight value for the intermediate image of the next image level; and
  applying a weighted average to the merged Gaussian image of the next image level and the intermediate image of the next image level based on the at least one calculated blending weight value of the next image level to generate a modified image of the next image level;
  wherein expanding, adding, calculating, and applying are repeated until an original image resolution of the plurality of obtained images is reached, wherein each of the obtained images has a same original image resolution, and wherein the resultant image comprises the modified image at the original image resolution.

9. The method of claim 8, wherein calculating at least one blending weight value comprises:
  calculating an intensity distance from a middle intensity value for a pixel in each intermediate image; and
  for a pixel in each intermediate image, determining a blending weight value based on a difference between a predetermined threshold value and the intensity distance.

10. The method of claim 9, wherein the predetermined threshold value is calculated according to the following expression:

$$\text{threshold} = \frac{2^{\text{level of the restored image}}}{\text{strength}};$$

wherein the strength value corresponds to a user-specified factor.

11. The method of claim 9, wherein the blending weight value is a function of pixel intensity and the predetermined threshold value.

12. The method of claim 9, wherein the blending weight value is calculated according to the following expression:

$$\text{weight value} = \min(1.0, e^{-K*[\max(0, |\text{pixel intensity} - \text{preferred intensity}| - \text{threshold})]});$$

wherein the preferred intensity value and K are constant terms,
wherein the preferred intensity value is equal to 0.5 and K is equal to 10.

13. A system for editing images in a frame sequence, comprising:
  a processor; and
  at least one application executable in the processor, the at least one application comprising:
    a media interface for obtaining a plurality of images having different exposure levels for a same scene;
    a merged weight generator for constructing a merged weight map for at least one obtained image by determining at least one merged weight value for at least one pixel of each obtained image based on characteristics of the pixel, wherein the merged weight map comprises a weight map corresponding to the plurality of images;
    a pyramid generator for generating a Gaussian pyramid and a Laplacian pyramid of each obtained image, generating a Gaussian pyramid of the merged weight map, generating a merged Gaussian pyramid and a merged Laplacian pyramid based on the Gaussian pyramid of the merged weight map, and generating an intermediate pyramid based on the merged Laplacian pyramid; and
    an image processor for constructing a resultant image by blending the merged Gaussian pyramid with the intermediate pyramid.

14. The system of claim 13, wherein the characteristics of the pixel for determining the merged weight value for each image comprises at least one of contrast, saturation, and intensity.

15. The system of claim 13, wherein the pyramid generator generates the Gaussian pyramid and the Laplacian pyramid of each obtained image by performing the steps of:
  setting one of the obtained images as an initial input image of a current image level;
  reducing a width and a height of the input image of the current image level by a factor of two;
  applying a Gaussian convolution to the input image of the current level to generate an input image for a next image level, the input image comprising a Gaussian image and the next image level being less than the current image level;
  expanding a width and a height of the input image of the next image level by a factor of two;
  applying a Gaussian convolution to the input image of the next level to generate an expanded image; and
  subtracting the input image of the current level from the expanded image to generate a Laplacian image for the current level;
  wherein reducing, expanding, and subtracting are repeated for the input image until a predetermined image level is reached.

16. The system of claim 15, wherein the Gaussian convolution is performed by a Gaussian kernel having a kernel size of X-by-Y, wherein X and Y are positive integers.

17. The system of claim 13, wherein the pyramid generator generates the merged Laplacian pyramid by applying a weighted average for each level of the Laplacian pyramid of each obtained image, wherein the weighted average comprises the Gaussian pyramid of the weight map.

18. The system of claim 13, wherein the pyramid generator generates the merged Gaussian pyramid by applying a weighted average for each level of the Gaussian pyramid of each obtained image, wherein the weighted average comprises the Gaussian pyramid of the weight map.

19. A non-transitory computer-readable medium embodying a program executable in a computing device, comprising:
  code that obtains a plurality of images having different exposure levels for a same scene;
  code that constructs a merged weight map for at least one obtained image by determining at least one merged weight value for at least one pixel of each obtained image based on characteristics of the pixel, wherein the merged weight map comprises a weight map corresponding to the plurality of images;
  code that generates a Gaussian pyramid and a Laplacian pyramid of each obtained image;

code that generates a Gaussian pyramid of the merged weight map;

code that generates a merged Gaussian pyramid and a merged Laplacian pyramid based on the Gaussian pyramid of the merged weight map;

code that generates an intermediate pyramid based on the merged Laplacian pyramid; and code that constructs a resultant image by blending the merged Gaussian pyramid with the intermediate pyramid.

20. The non-transitory computer-readable medium of claim 19, wherein the code for generating the Gaussian pyramid and the Laplacian pyramid further comprises:

code for setting, for each of the obtained images, one of the obtained images as an initial input image of a current image level;

code for reducing, for each of the obtained images, a width and a height of the input image of the current image level by a factor of two;

code for applying, for each of the obtained images, a Gaussian convolution to the input image of the current level to generate an input image for a next image level, the input image comprising a Gaussian image and the next image level being less than the current image level;

code for expanding a width and a height of the input image of the next image level by a factor of two;

code for applying a Gaussian convolution to the input image of the next level to generate an expanded image; and code for subtracting, for each of the obtained images, the input image of the current level from the expanded image to generate a Laplacian image for the current level;

wherein reducing, expanding, and subtracting are repeated for the input image until a predetermined image level is reached.

21. The non-transitory computer-readable medium of claim 20, wherein the Gaussian convolution is performed by a Gaussian kernel having a kernel size of X by Y, wherein X and Y are positive integers.

22. The non-transitory computer-readable medium of claim 19, the code for generating the intermediate pyramid based on the merged Laplacian pyramid and constructing a resultant image from the merged Gaussian pyramid and the intermediate pyramid further comprises:

code for obtaining a merged Laplacian image at a current image level of the merged Laplacian pyramid;

code for expanding a width and a height of the merged Laplacian image by a factor of two;

code for applying Gaussian convolution to the merged Laplacian image to produce an expanded image;

code for adding the expanded image to a merged Laplacian image of the next image level to generate an intermediate image of the next image level;

code for calculating at least one blending weight value for the intermediate image of the next image level; and code for applying a weighted average to the merged Gaussian image of the next image level and the intermediate image of the next image level based on the at least one calculated blending weight value of the next image level to generate a modified image of the next image level;

wherein expanding, adding, calculating, and applying are repeated until an original image resolution of the plurality of obtained images is reached, wherein each of the obtained images has a same original image resolution, and wherein the resultant image comprises the modified image at the original image resolution.

23. The non-transitory computer-readable medium of claim 19, wherein code for calculating the at least one blending weight value further comprises:

code for calculating an intensity distance from a middle intensity value for a pixel in each intermediate image; and code for determining, for a pixel in each intermediate image, a blending weight value based on a difference between a predetermined threshold value and the intensity distance.

* * * * *